Feb. 20, 1951 D. S. CAMPBELL 2,542,231
TOASTER
Filed Oct. 10, 1946 4 Sheets-Sheet 1
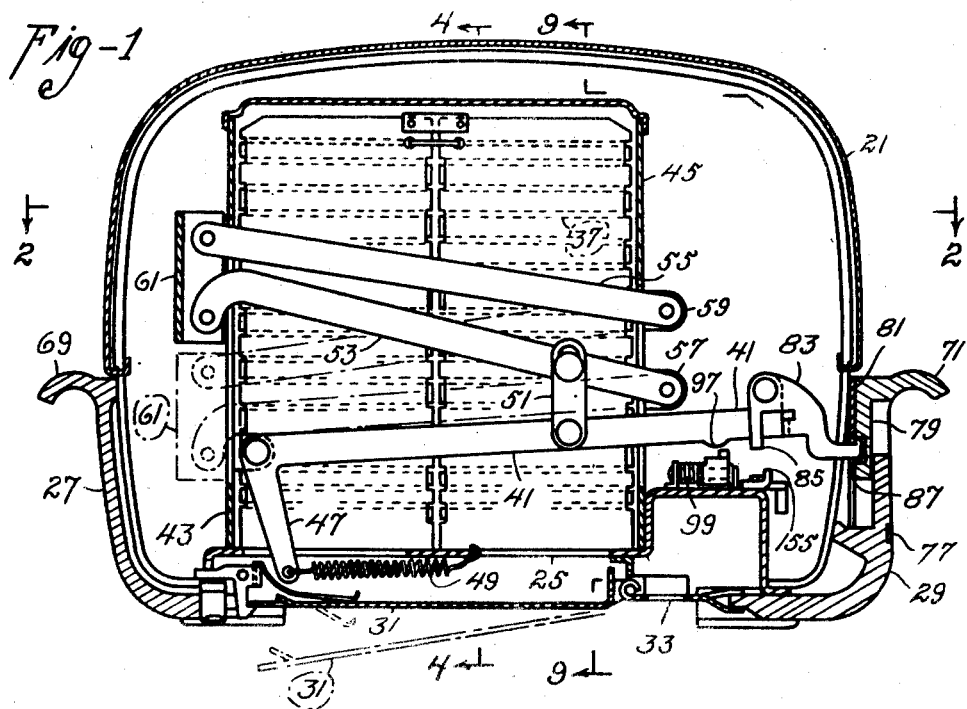
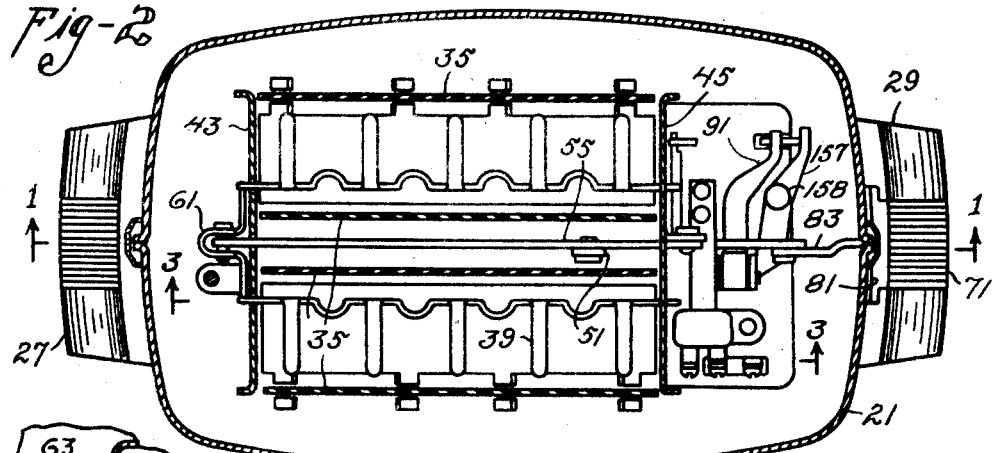
INVENTOR.
D. SCOTT CAMPBELL
BY
ATTY

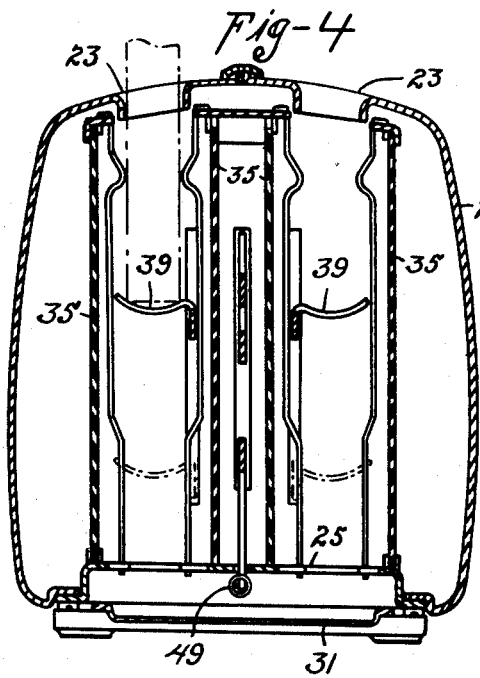
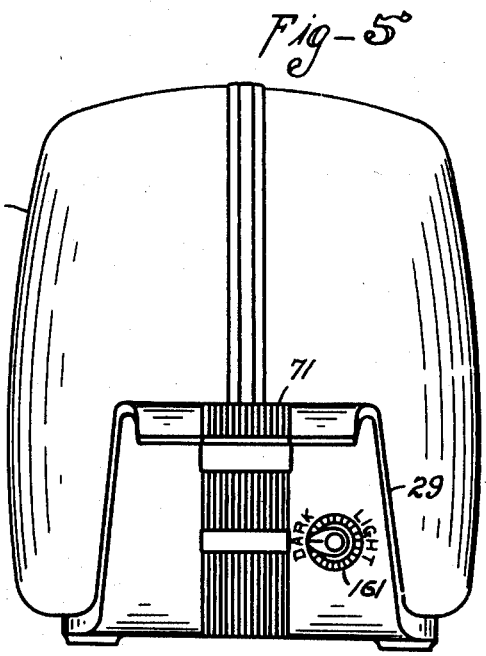
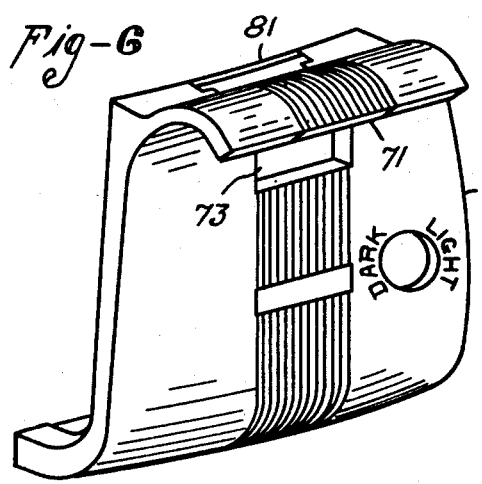
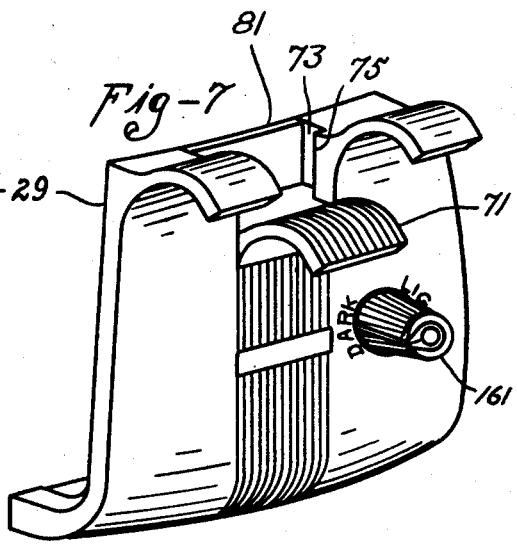
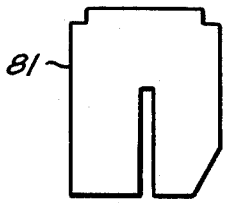

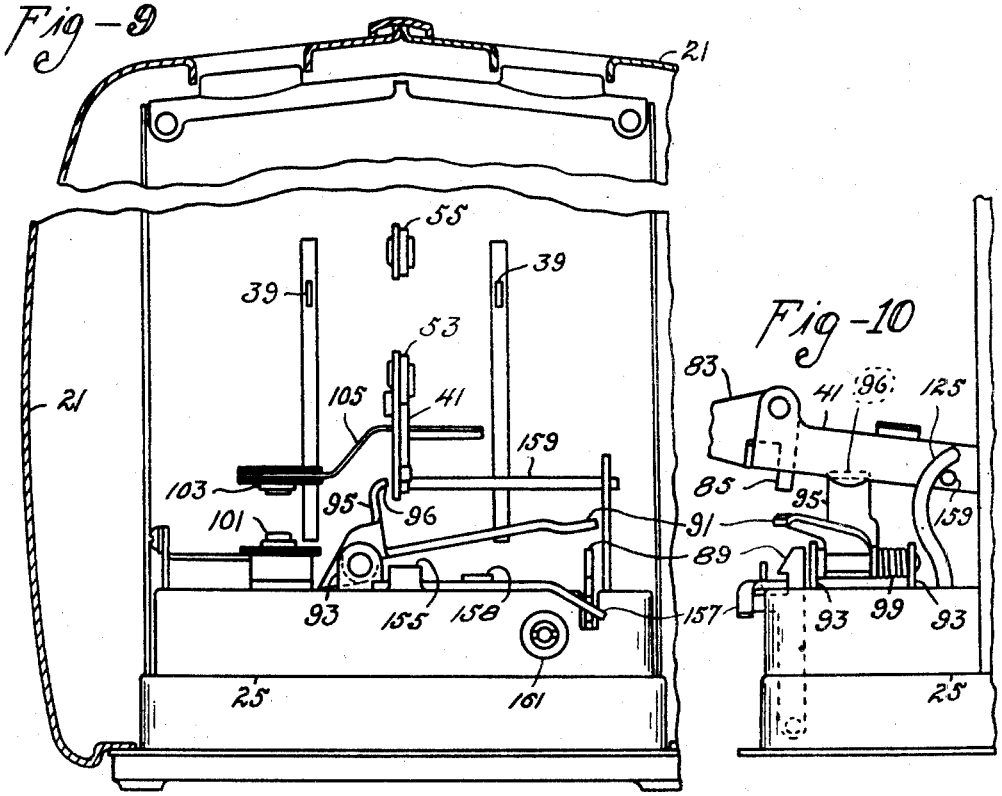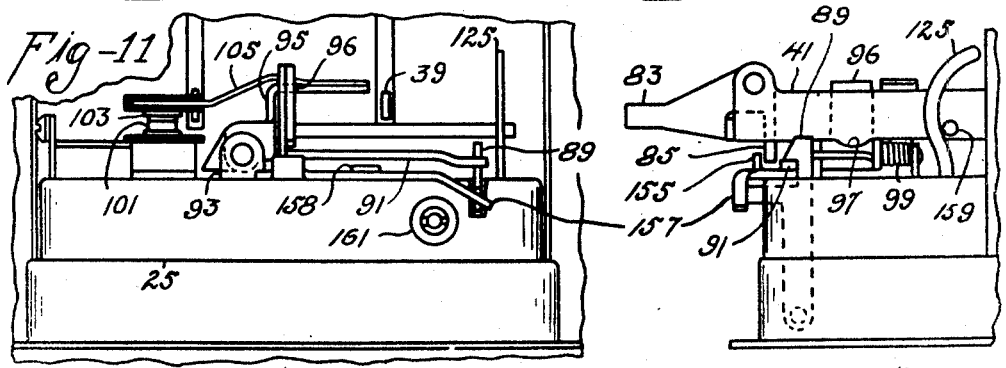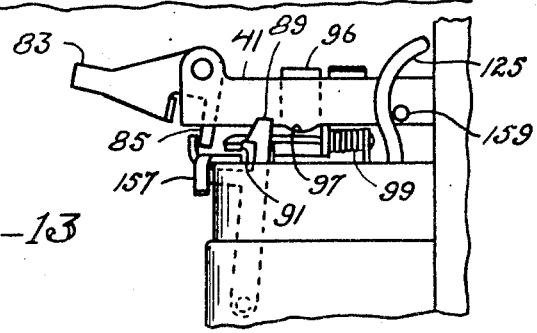

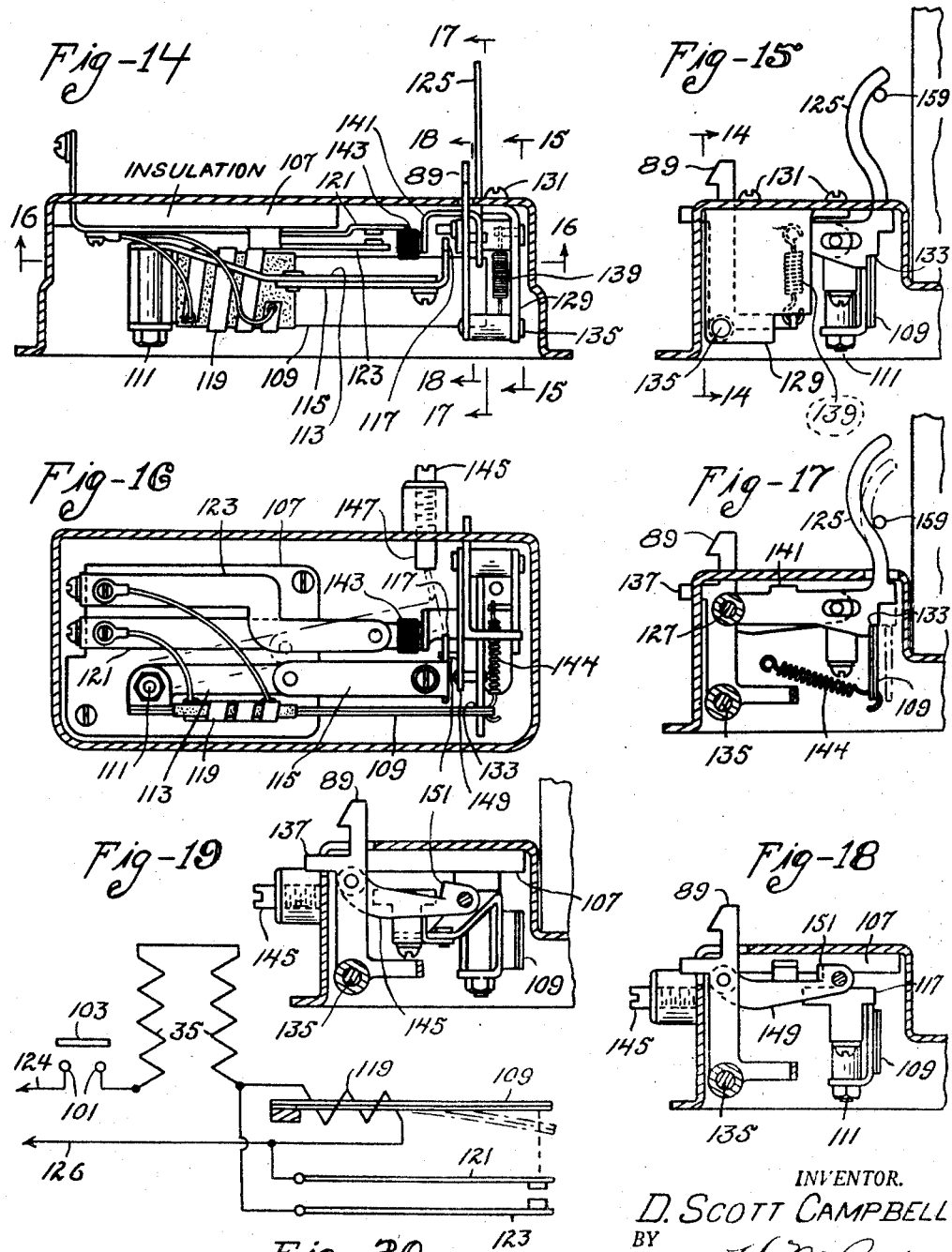

Patented Feb. 20, 1951

2,542,231

UNITED STATES PATENT OFFICE 2,542,231

TOASTER

Date Scott Campbell, Elgin, Ill., assignor to McGraw Electric Company, Elgin, Ill., a corporation of Delaware Application October 10, 1946, Serial No. 702,514

3 Claims. (Cl. 99—391)

My invention relates to automatic electric toasters and particularly to novel means for starting a toasting cycle.

An object of my invention is to provide a relatively simple manually-actuable means for initiating a toasting operation.

Another object of my invention is to provide a relatively simple manually-actuable means for causing movement of bread carriers from their normal non-toasting positions to their toasting positions.

Another object of my invention is to provide a novel form of toaster handle, a part of which is manually movable to start a toasting operation and to move the bread carriers into toasting position.

Other objects of my invention will either be apparent from a description of one form of device embodying my invention or will be pointed out in the course of such description and set forth particularly in the appended claims.

In the drawings,

Figure 1 is a view in vertical, longitudinal section through a toaster embodying my invention taken on the line 1—1 of Fig. 2, Fig. 2 is a horizontal, sectional view therethrough taken on the line 2—2 of Fig. 1, Fig. 3 is a fragmentary, vertical, longitudinal section taken on the line 3—3 of Fig. 2, Fig. 4 is a vertical, lateral, sectional view taken on the line 4—4 of Fig. 1, Fig. 5 is a view in front elevation of the toaster, Fig. 6 is a view in perspective and on an enlarged scale, of the front handle with the parts shown in non-toasting position, Fig. 7 is a view similar to Fig. 6 except the center portion thereof has been moved into toasting position, Fig. 8 is a view in front elevation of a metal insert, Fig. 9 is a fragmentary, vertical, lateral section on an enlarged scale taken on the line 9—9 of Fig. 1, the parts being shown in non-toasting position, Fig. 10 is a fragmentary side view of Fig. 9.

Fig. 11 is a fragmentary view similar to Fig. 9, with the parts shown in toasting position, Fig. 12 is a side view of the parts shown in Fig. 11, Fig. 13 is a view similar to Fig. 12 except showing certain parts thereof in raised position, Fig. 14 is a view in vertical, longitudinal section through a thermostatic time control taken on the line 14—14 of Fig. 15, Fig. 15 is a sectional view taken on the line 15—15 of Fig. 14 with the parts shown in non-toasting position.

Fig. 16 is a sectional view taken on the line 16—16 of Fig. 14,

Fig. 17 is a sectional view taken on the line 17—17 of Fig. 14 with the parts shown in toasting position, Fig. 18 is a sectional view taken on the line 18—18 of Fig. 14 with the parts shown in toasting position, Fig. 19 is a view similar to Fig. 18 except that the parts are shown in the positions they will occupy when the bimetal has flexed to full extent and the parts are in the positions shown by broken lines in Fig. 17, and, Fig. 20 is a diagram of the electric circuits governing the operation of the toaster.

I have elected to show my invention as applied to a two-slice toaster comprising an outer casting 21 having in its upper wall two openings 23 through which slices of bread may be placed into position in the two toasting chambers within the casing and through which toasted pieces of bread may be removed therefrom after having been toasted. The toaster assembly includes also a bottom plate 25, a rear lifting handle 27, as well as a front lifting handle 29, the two being of substantially L-shape in vertical section as will be hereinafter more clearly set forth.

The toaster assembly includes also a pivotally mounted crumb tray 31 which is pivotally connected with a substantially stationary bottom closure 33 as is disclosed in a co-pending application, S. N. 639,018, filed February 4, 1946, and assigned to the same assignee as is the present application. Reference may be had to said co-pending application for further details of the crumb tray mounting, construction and operation.

The toaster assembly includes a pair of planar vertical toast heating elements 35 for each of said toast heating chambers. Each of said toast heating elements comprise one or more sheets of thin suitable electric-insulating material, such as mica, on which may be wound a resistor strip 37 all in a manner now well-known in the art.

I provide in a two-slice toaster a pair of bread carriers 39 which are normally in their upper raised non-toasting position and which may be moved downwardly into toasting position by means comprising a motion-decreasing mechanism of substantially the following construction.

A longitudinally extending lever arm 41 is pivotally mounted against a rear intermediate wall 43 and extends forwardly through a slot in a front intermediate wall 45. The arm 41 has integral therewith a short vertically depending arm 47 to the lower end of which is secured a biasing spring 49 having its other end secured to bottom plate 25 to normally cause a bias to be given to arm 41 in a counter-clockwise direction, the amount of turning movement thereof being limited by the length of the slot in the front intermediate wall 45. A short link 51 is pivotally connected to the arm 41 intermediate its ends and has a loose pivotal connection with the lower arm 53 of two arms including a second upper arm 55. Arm 53 is pivotally supported at its front end on a lug 57 while arm 55 is pivotally supported on its front end on a lug 59, lugs 57 and 59 being fixedly mounted against the front intermediate wall 45. The rear ends of arms 53 and 55 are pivotally mounted on a bracket 61, which bracket 61, of substantially channel shape in horizontal section, is adapted to move downwardly when the bread carriers are moved to their lower toasting position.

Since the effect of the tension spring 49 is to cause a quick upward movement of the bread carriers, I provide shock absorber means comprising a cylinder 63 at the rear end of the toaster, which cylinder is mounted against the rear intermediate wall 43. This cylinder and a piston and a piston rod 65 which has a loose connection with the bracket 61 as by extending through a horizontal lug 67 are adapted to take up the shock which would otherwise be given to the entire relatively light toaster assembly.

The rear lifting handle 27 which is of substantially L-shape, having at its upper end a substantially horizontally extending portion 69 is suitably secured against the rear end wall of the toaster casing 21. The front lifting handle 29 is made in three parts and includes a central movable portion 71 which is of substantially the same shape as the adjacent parts of the handle 29. The downwardly manually-movable portion 71 is adapted to be held in its proper operative position by fitting into a recess 73 in handle 29, the side walls of the recess being undercut as shown at 75, the width of the rear part of recess 73 being greater than the front portion thereof so as to hold the member 71 in its proper operative position within the front handle 29.

The recess 73 connects with a lower flat recess 77 which is adapted to provide space for the lower end portion 79 of member 71. I provide further a metal plate 81 (see Fig. 8) which is held against the rear surface of handle 29 to substantially completely cover the recesses 73 and 77.

The front end portion of arm 41 has pivotally mounted thereon a short horizontally extending arm 83 and a vertically extending arm 85. The enlarged front end portion of arm 83 is adapted to loosely fit a shallow recess 87 in the rear surface member 71 so that when an operator presses downwardly on member 71, he will cause downward movment not only of the arms 83 and 85, but also of arm 41 and therefore of the bread carriers from their upper non-toasting position into their lower toasting position.

Means for holding the bread carriers in their lower toasting positions comprising a latch 89 and a latching member 91, which latter is pivotally mounted on a pair of lugs 93 struck up from member 25. The latching member 91 is provided with a substantially vertically extending integral portion 95 having a laterally extending lug 96 thereon which is adapted to extend over the arm 41 and hold the same when the same has been moved downwardly. During the downward movement of arm 41 a projection 97 on the lower edge of arm 41 is adapted to engage the upper surface of arm 91 and cause turning movement thereof in a clockwise direction against the biasing spring 99 until the outer end of the right-hand end as seen in Figs. 9 and 11 is engaged under the hook-shaped end of latch 89.

The toaster includes also means for controlling the energization of the toast heating elements comprising particularly the resistor strips 37, this control means comprising a pair of fixed contacts 101 insulatedly mounted on and supported by the bottom plate 25 and a contact bridging member 103 which is insulatedly supported as by a resilient member 105 which is secured to arm 41.

The toaster structure includes also a thermal timing means for controlling the length of time that the latching member 91 is hooked under the latch 89 and will now be described. An electric-insulating plate 107 is secured against the under surface of the front raised portion of the bottom plate 25 and has secured thereto a bimetal bar 109 which is pivotally mounted on a pin 111 mounted on plate 107. Rigidly secured to the left-hand end portion of bimetal bar 109 is a rigid arm 113 having at its right-hand or free end an adjustable arm 115 secured thereto, which has an upwardly extending portion 117 of substantially T-shape in section. An electric heating element 119 is insulatedly mounted on bimetal bar 109.

Energization of the heating element 119 is controlled by two arms 121 and 123 which extend partially in parallel relatively to each other on the under surface of electric insulating member 107, while the end portions thereof extend in two vertical planes relatively to each other as will be noticed particularly in Fig. 16 of the drawings.

A stop bar 125 of substantially L-shape is pivotally mounted on a pin 127 which is suitably secured against a plate 129 which is secured as by means of one or more short machine screws 131 against the under surface of bottom plate 25. Stop bar 125 is provided with a recess 133 at the junction of the vertically and of the horizontally extending arms. The bimetal bar 109 is adapted during the cycle of operation of the toaster to fit into the shoulder comprising the recess 133. The latch 89 is pivotally mounted on a pin 135 which is also secured against plate 129. Latch 89 has a forwardly extending lug 137 for a purpose which will be hereinafter described. The latch 89 is biased forwardly or into a counter-clockwise direction by a spring 139 connected to a horizontally extending arm constituting a part of the latch 89.

The stop bar 125 has integral therewith a lateral extension 141 which has at its outer vertically extending end a small member 143 of electric-insulating material which normally engages the lower surface of arm 123.

It is desired to first energize the auxiliary heating element 119 and then to deenergize the same in order to first heat up the bimetal bar 109 and then to cause the same to be cooled. A spring 144 is adapted to bias the bimetal bar 109 to normally occupy the position shown particularly in Fig. 17 of the drawings. If we now assume that heating coil 119 has been energized, the bimetal bar 109 will tend to flex in a counter-clockwise direction as seen when looking at Fig. 16 but is prevented from doing so by reason of its engagement in the shoulder formed by recess 133 in stop bar 125. However, the rigidly connected rigid arm 113 is caused to turn in a counter-clockwise direction as seen in Fig. 16 of the drawings until the left-hand end of member 117 engages an adjustable stop 145. This stop 145 may comprise nothing more than a screw-threaded small rod which may be turned so that its inner end portion 147 extends more or less inside of the side wall of the bottom plate 25 seen in Fig. 16. It is evident that when stop 145 has been screwed in that the inner end portion 147 will normally be closer to the left-hand end portion of member 117 than if it had not been screwed in to such an extent. The engagement of the right-hand end portion of member 117 with the end of portion 147 will therefore cause a right-hand flexure of the outer end of bimetal bar 109 with the result that the bimetal bar will move out of the recess 133 and permit downward movement of stop bar 125 as well as of member 143 with the result that two contacts on the free ends of arms 121 and 123 will move into engagement with each other thereby short-circuiting the auxiliary heating coil 119.

The latch 89 has pivotally mounted thereon a substantially horizontally extending arm 149 which has a laterally extending lug 151, which lug is adapted to be moved into a plane which will be traversed by portion 117 during the cooling of bimetal member 109 consequent upon the deenergization as by short-circuiting, of the auxiliary heater 119. This engagement of portion 117 with member 151 will cause a release movement in a clockwise direction of latch 89 whereupon spring 49 will cause quick upward movement of the bread carriers 39 into non-toasting position.

If the operator should desire to stop the toasting operation before it is stopped as just has hereinbefore been described, it is only necessary to cause upward movement of portion 71 of the front handle which will cause engagement of member 85 with a vertically extending lug 155 of an arm 157 pivotally mounted intermediate its ends on a pin 158 on the upper surface of bottom plate 25.

The stop bar 125 and particularly its vertically extending arm is of arcuate shape and is adapted to be moved in a counter-clockwise direction when arm 41 is returned to the position shown in Figs. 9 and 10. This is effected by a rod 159 extending laterally from arm 41, which arm engages the inner surface of stop bar 145 as is shown more particularly in Figs. 10, 12 and 13 of the drawings, with the result that inner end of stop bar 125 is raised to cause upward movement of insulating member 143 and resultant disengagement of the two contact members on the contact arms 121 and 123.

Means for adjusting the length of time that the bread carriers are held in their toasting or lower positions comprises a knob 161 which is positioned at the right of the metal plate 81 as is shown more particularly in Figs. 6 and 7 of the drawings.

In earlier toasters having substantially the same kind of thermal timer as herein described but the means causing movement of bread carriers from their non-toasting positions to their toasting positions was entirely different and comprised a separate knob adapted to be pressed by an operator. In my invention I provide a toaster lifting means which has a portion of one of the handles so shaped that it can be moved downwardly by an operator in order to start a toasting operation.

Downward movement of part 71 may also be effected by downward pressure on part 71 by the operator's thumb, while his index and second finger are below the horizontal parts of handle 29.

I wish to point out that the details of the thermal timer constitute no part of my present invention but have been illustrated and described so as to show the parts that are connected with and actuated by part 71.

Various modifications may be made in the device embodying my invention without departing from the spirit and scope thereof and all such modifications clearly coming within the scope of the appended claims shall be considered a part of my invention.

I claim as my invention:

1. In a toaster, the combination with a casing, heating means in said casing for toasting bread, a bread carrier in said casing, means for moving said carrier relative to said heating means between a toasting position and a non-toasting position, and a movable member actuable for effecting such relative movement, of, a handle outside of said casing secured to the toaster, said handle having a finger-engaging portion suitable for engagement by the hand for lifting and carrying said toaster, an operating handle having a finger engaging portion, means separate from said movable member for supporting said operating handle for vertical movement on said toaster along a path that lies alongside said first handle, a stop for preventing upward motion of said operating handle beyond a position at which its finger-engaging portion lies alongside the finger-engaging portion of the first handle, whereby said finger-engaging portions of said two handles may be used in conjunction for lifting and carrying the toaster, and means operatively connecting said movable member to said operating handle for movement thereby.

2. The combination of claim 1 wherein said connecting means between the two parts, one the movable member and the other, the operating handle, include a horizontal tongue on one of said parts extending into a socket between upper and lower abutments on the other part.

3. The combination of claim 1 wherein said operating handle is supported for vertical sliding movement on said casing of said toaster, and wherein said stop also is on said casing.

D. SCOTT CAMPBELL.

REFERENCES CITED

The following references are of record in the file of this patent:

UNITED STATES PATENTS

| Number | Name | Date |
|---|---|---|
| 1,198,374 | Overbury | Sept. 12, 1916 |
| 1,836,686 | Sehling | Dec. 15, 1931 |
| 1,949,124 | Kuhn et al. | Feb. 27, 1934 |
| 2,266,045 | Ireland | Dec. 16, 1941 |
| 2,288,699 | Gomersall et al. | July 7, 1942 |
| 2,358,766 | Lucia | Sept. 19, 1944 |
| 2,414,325 | Newell | Jan. 14, 1947 |
| 2,429,183 | Goldberg | Oct. 14, 1947 |